(12) United States Patent
Li et al.

(10) Patent No.: US 10,746,297 B2
(45) Date of Patent: Aug. 18, 2020

(54) ELECTRONIC PARKING LOCK ACTUATOR FOR AUTOMATIC TRANSMISSION OF VEHICLE

(71) Applicant: Johnson Electric International AG, Murten (CH)

(72) Inventors: Linan Li, Hong Kong (HK); Yong Shuai, Hong Kong (HK); Jinan Nie, Hong Kong (HK); Hang Su, Hong Kong (HK); Yajie Chen, Hong Kong (HK)

(73) Assignee: Johnson Electric International AG, Murten (CH)

( * ) Notice: Subject to any disclaimer, the term of this patent is extended or adjusted under 35 U.S.C. 154(b) by 7 days.

(21) Appl. No.: 16/178,655

(22) Filed: Nov. 2, 2018

(65) Prior Publication Data

US 2019/0136974 A1 May 9, 2019

(30) Foreign Application Priority Data

Nov. 2, 2017 (CN) .......................... 2017 1 1066296

(51) Int. Cl.
| | |
|---|---|
| *F16H 57/02* | (2012.01) |
| *F16H 63/34* | (2006.01) |
| *F16H 57/039* | (2012.01) |
| *F16H 57/031* | (2012.01) |
| *F16H 37/04* | (2006.01) |

(52) U.S. Cl.
CPC ....... *F16H 63/3466* (2013.01); *F16H 57/039* (2013.01); *F16H 63/3491* (2013.01); *F16H 37/041* (2013.01); *F16H 57/031* (2013.01); *F16H 2057/02034* (2013.01); *F16H 2057/02082* (2013.01)

(58) Field of Classification Search
CPC .............. F16H 63/3466; F16H 57/039; F16H 63/3491; F16H 37/041; F16H 2057/02082; F16H 2057/02034; F16H 57/031
See application file for complete search history.

(56) References Cited

U.S. PATENT DOCUMENTS

| | | | |
|---|---|---|---|
| 2002/0162709 A1* | 11/2002 | Drennen ................. | F16D 65/18 188/72.1 |
| 2007/0281827 A1* | 12/2007 | Shimizu ................. | B60T 7/107 477/92 |
| 2014/0182980 A1* | 7/2014 | Muramatsu ........... | B60T 13/741 188/156 |
| 2016/0377137 A1* | 12/2016 | Ohlig .................... | B60T 13/741 188/106 F |
| 2018/0079400 A1* | 3/2018 | Crossman ............. | B60T 15/028 |
| 2019/0024790 A1* | 1/2019 | Jeon ....................... | F16H 59/68 |
| 2019/0107184 A1* | 4/2019 | Matsuto ............... | F16H 25/2219 |

* cited by examiner

*Primary Examiner* — David J Hlavka

(57) ABSTRACT

An electronic parking lock actuator includes a driving motor configured to generate a driving force, an output mechanism including an emergency unlocking feature, a reduction transmission mechanism connected between the driving motor and the output mechanism to transfer a driving force generated by the driving motor to output mechanism, a control device electrically connected to the power mechanism for controlling the power mechanism, and a casing receiving all of the driving motor, the output mechanism, the reduction transmission, the controller therein. The casing defines an opening configured to expose the emergency unlocking feature.

11 Claims, 5 Drawing Sheets

ELECTRONIC PARKING LOCK ACTUATOR FOR AUTOMATIC TRANSMISSION OF VEHICLE

CROSS REFERENCE TO RELATED APPLICATIONS

This non-provisional patent application claims priority under 35 U.S.C. § 119(a) from Patent Application No. 201711066296.7 filed in The People's Republic of China on Nov. 2, 2017.

FIELD OF THE INVENTION

The present invention relates to an actuator, and more particularly to a parking lock actuator for automatic transmission of vehicle.

BACKGROUND OF THE INVENTION

With the widespread use of electronic controls in vehicle, more and more automatic transmission vehicles use a parking lock actuator instead of a conventional shift lever to lock the transmission in parking. An existing parking lock actuator typically includes a motor and a corresponding speed reduction mechanism, such as a worm/gear, gear train, etc., and the controller of the motor is typically designed separately and then coupled to the motor via a cable. This design is not compact enough and takes up a lot of space.

SUMMARY OF THE INVENTION

One aspect of the present invention provides an electronic parking lock actuator including a driving motor configured to generate a driving force, an output mechanism including an emergency unlocking feature, a reduction transmission mechanism connected between the driving motor and the output mechanism to transfer a driving force generated by the driving motor to output mechanism, a control device electrically connected to the power mechanism for controlling the power mechanism, and a casing receiving all of the driving motor, the output mechanism, the reduction transmission, the controller therein. The casing defines an opening configured to expose the emergency unlocking feature.

Preferably, the electronic parking lock actuator further includes a gear lid installed in the casing, the output mechanism and the reduction transmission mechanism are disposed on one of opposite sides of the gear lid, the controller is disposed on the other one of the opposite sides of the gear lid to isolate the controller from the output mechanism and the reduction transmission mechanism by the gear lid, the gear lid defines a first through hole in alignment of the opening of the casing and the emergency unlocking feature.

Preferably, the gear lid is provided with an annular flange surrounding the first through hole, the casing is provided with a cylindrical extension portion surrounding the opening a blocking portion depending on the inner wall of the extension portion, the annular flange extends into the extension portion, the end of the annular flange abuts against the blocking portion, the outer circumferential surface of the flange abuts against the inner wall surface of the extending portion.

Preferably, the casing includes an upper cover and a lower cover mated with each other, and the lower cover is provided with a partition wall depending on a side of the lower cover facing the upper cover, a mounting area is enclosed by the partition wall, the gear lid includes a lid bottom wall and a lid side wall extending perpendicularly downwards from periphery of the lid bottom wall, the lid side wall mates with the partition wall of the lower cover to close the reduction transmission mechanism and the output mechanism between the cover and the lower cover.

Preferably, the end of the lid side wall has an uneven structure, and the uneven structure is complementary to an uneven structure of the partitioning wall, so that the gear lid and the lower cover is tightly engaged with each other.

Preferably, the gear lid defines a second through hole, the reduction transmission mechanism is a double gear set including a first gear, a second gear with a diameter smaller than that of the first gear, and a connecting shaft; the first gear and the second gear are coaxially fixedly coupled by the connecting shaft, an end of the connecting shaft is rotatably positioned in the second through hole of the gear lid.

Preferably, the first gear defines a plurality of concentric annular grooves around the center of the first gear, the lid bottom wall is provided with a plurality of concentric rings on a side facing the lower cover around the second through hole, the concentric rings are correspondingly embedded in the annular grooves.

Preferably, the driving motor includes a motor body and a driving shaft extending from the motor body, the driving motor is a DC motor, a worm is formed on the driving shaft.

Preferably, the output mechanism includes an output gear engaged with the second gear of the reduction transmission mechanism and an output shaft coaxially extends from the output gear.

Preferably, the electronic parking lock actuator further includes a plug detachable plugged in the opening of the casing.

Preferably, the emergency unlocking feature is a hexagonal hole.

Below, embodiments of the present invention will be described in detail with reference to the accompanying drawings.

DETAILED DESCRIPTION OF THE PREFERRED EMBODIMENTS

Figure 1:
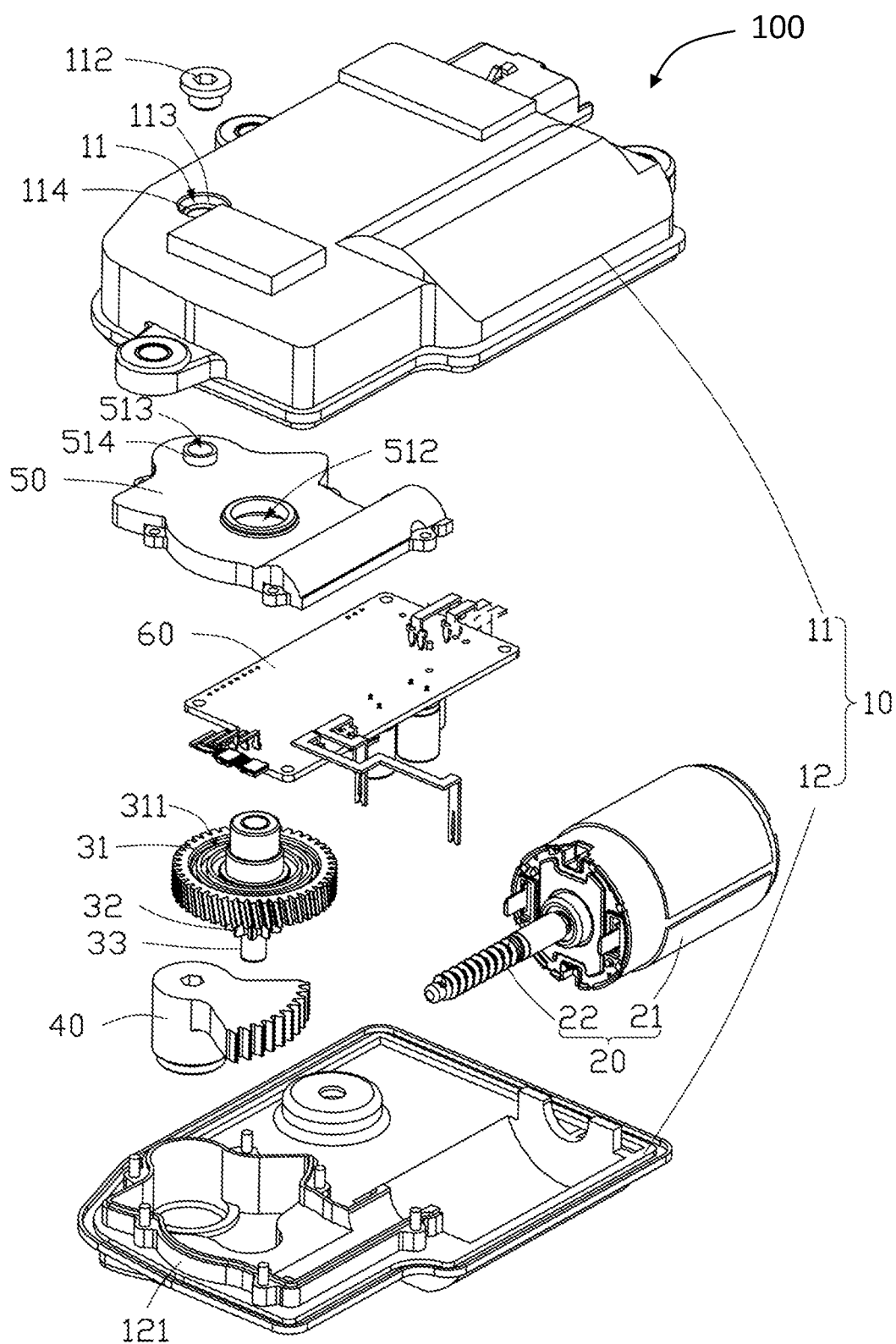
FIG. 1 is an exploded perspective view of a parking lock actuator according to an embodiment of the present disclosure.
Figure 2:
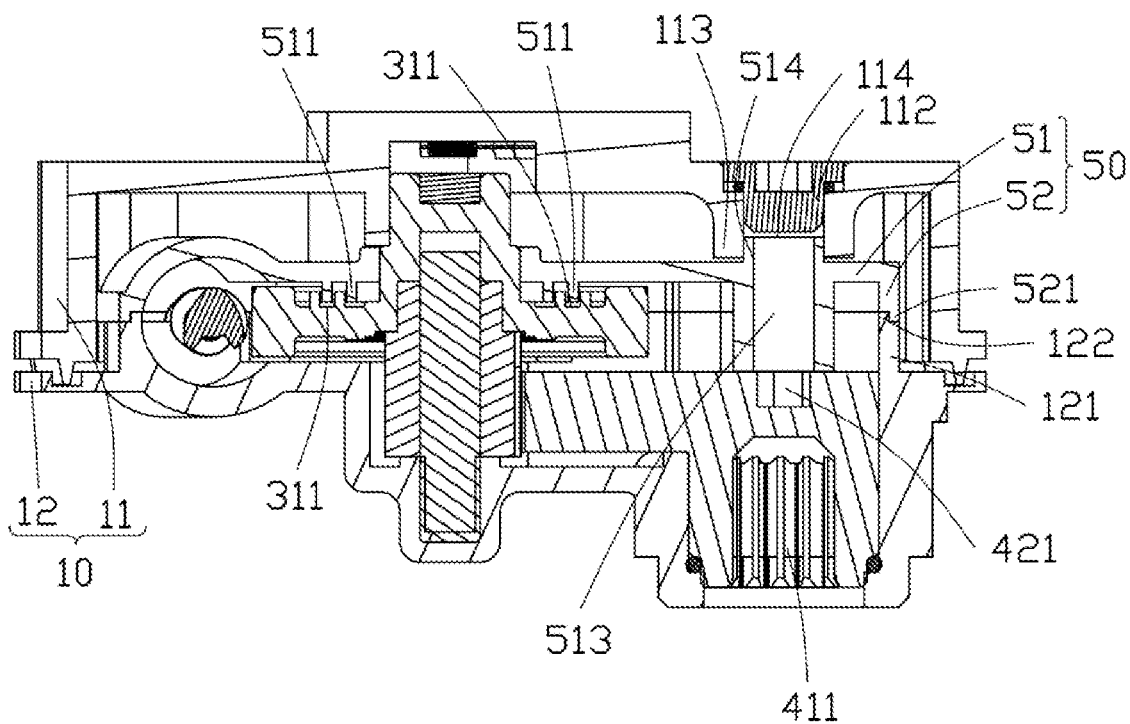
FIG. 2 is a cross-sectional view showing the parking lock actuator shown in FIG. 1 in assembly.
Figure 3:
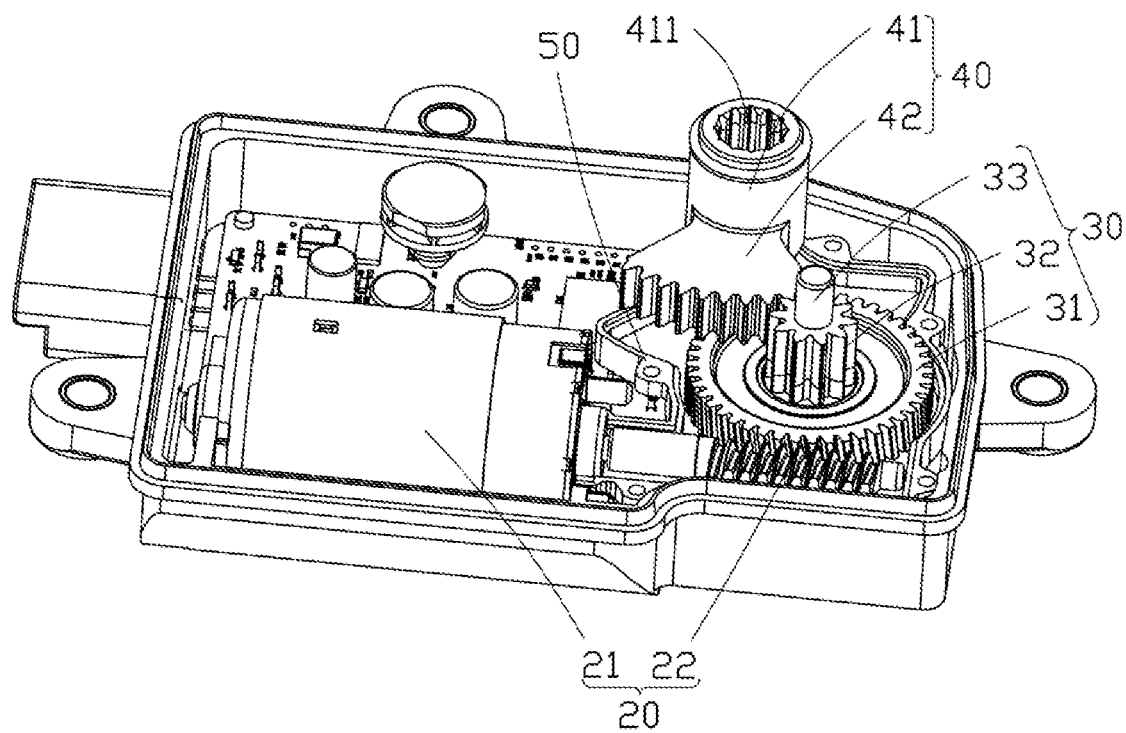
FIG. 3 is an assembled perspective view of the parking lock actuator shown in FIG. 1 with a lower cover removed.

Please refer to FIG. 1 to FIG. 3, the parking lock actuator 100 includes a casing 10, a driving motor 20, a reduction transmission mechanism 30 connected to the driving motor 20, an output mechanism 40, and a gear lid 50, and a controller 60. The casing 10 defines a receiving room therein, and the driving motor 20, the reduction transmission mechanism 30, the output mechanism 40, and the controller 60 are housed in the receiving room.

The casing 10 includes an upper cover 11 and a lower cover 12. The upper cover 11 and the lower cover 12 are mated with each other to define the receiving room. It can be understood that the specific structure of the upper cover 11 and the lower cover 12 can be adaptively modified according to the structure of the driving motor 20, the reduction transmission mechanism 30 and the output mechanism 40, which are not limited to what is shown in the Figures of the present disclosure.

The upper cover 11 defines an opening 111 and a plug 112. In a normal state, the plug 112 is plugged in and close the opening 111. It can be understood that the plug 112 can be fixed in the opening 111 by means of snapping or screwing. The inner side surface of the upper cover 11 is provided with a cylindrical extension portion 113 surrounding the opening 111, and an annular blocking portion 114 depending on the inner wall of the extension portion 113

The lower cover 12 can be coupled to the upper cover 11 in a sealing connection. In the embodiment, the lower cover 12 is made of a resin. A partition wall 121 depends on a side of the lower cover 12 facing the upper cover 11. A mounting area for the reduction transmission mechanism 30, the output mechanism 40 and a portion of the driving motor 20 placed therein if enclosed by the partition wall 121. In the present embodiment, the partition wall 121 is integrally formed with the lower cover 12. An end edge of the partition wall 121 away from lower cover 12 has a stepped structure.

The driving motor 20 includes a motor body 21 and a driving shaft 22 extending from the motor body 21. In the present embodiment, the driving motor 20 is a DC (Direct Current) motor.

The driving shaft 22 is coupled to the reduction transmission mechanism 30 and drives the reduction transmission mechanism 30 to rotate. In the present embodiment, a worm is formed on the driving shaft 22.

In one embodiment, the reduction transmission mechanism 30 is a double gear set including a first gear 31 having a larger diameter, a second gear 32 having a smaller diameter, and a connecting shaft 33. The first gear 31 and the second gear 32 are coaxially fixedly coupled by the connecting shaft 33, so that the first gear 31 and the second gear 32 can rotate synchronously.

In one embodiment, the first gear 31 defines a through hole in a center thereof. The connecting shaft 33 is fixed in the through hole of the first gear 31 in an interference fit to make the first gear 31 to be firmly engaged with the connecting shaft 33. A surface of the first gear 31 facing the upper cover 11 is provided with a plurality of concentric annular grooves 311 surrounding the center of the first gear 31.

The second gear 32 is made of resin, and is directly fixed and coaxial to the connecting shaft 33. In one embodiment, the connecting shaft 33 is fixed to the second gear 32 by insert molding. It can be understood that, in other embodiment, the second gear can also be made of a metal material, and is fixedly connected to the connecting shaft 33 by an interference fit, similar to the connection way between the first gear 31 and the connecting shaft 33. The second gear 32 abuts against the first gear 31, and the second gear 32 is located on a side of the first gear 31 facing the lower cover 12.

Figure 5:
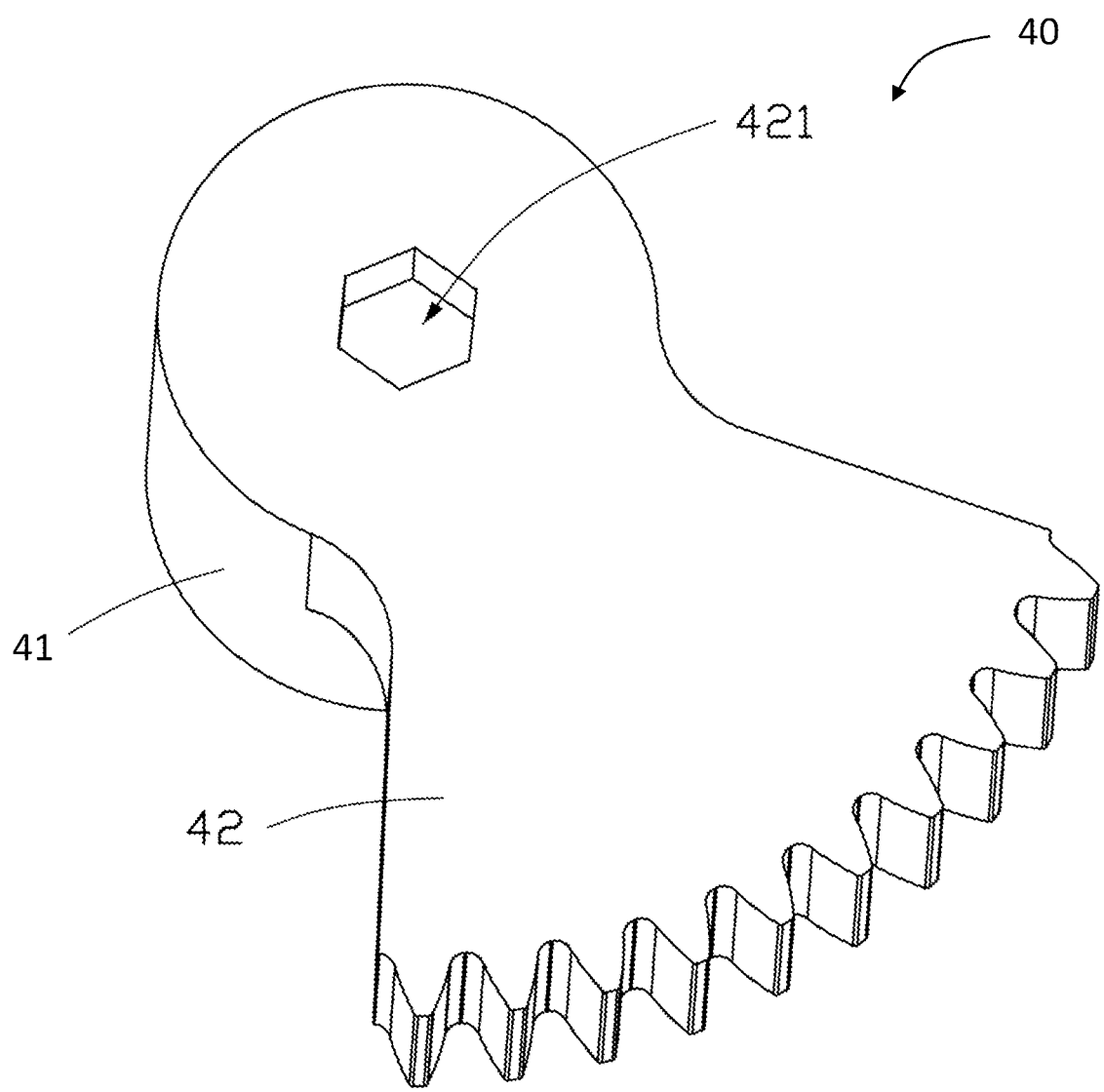
FIG. 5 is a perspective view of an output part of the parking lock actuator shown in FIG. 1.

Referring to FIG. 5, the output mechanism 40 includes an output shaft 41 and an output gear 42. The output gear 42 is fixed to the output shaft 41 and enable the output shaft 41 to rotate synchronously with the output gear 42.

In one embodiment, the output gear 42 is a sector gear. The output shaft 41 coaxially extends from a side of the output gear 42. One end of the output shaft 41 facing away from the output gear 42 is provided with a connecting hole 41 along the axial direction of the output shaft 41. The connection hole is configured to be engaged with a locking mechanism of an automatic transmission, for example a lock actuating rod. So that, the lock mechanism can be driven to be locked or unlocked through the parking lock actuator.

An emergency unlocking feature 421 is formed at a side of the output gear 42 facing away from the output shaft 41. In the present embodiment, the emergency unlocking feature 421 is a hexagonal hole in alignment with a central axial of the output gear 42 and the output shaft 41.

Figure 4:
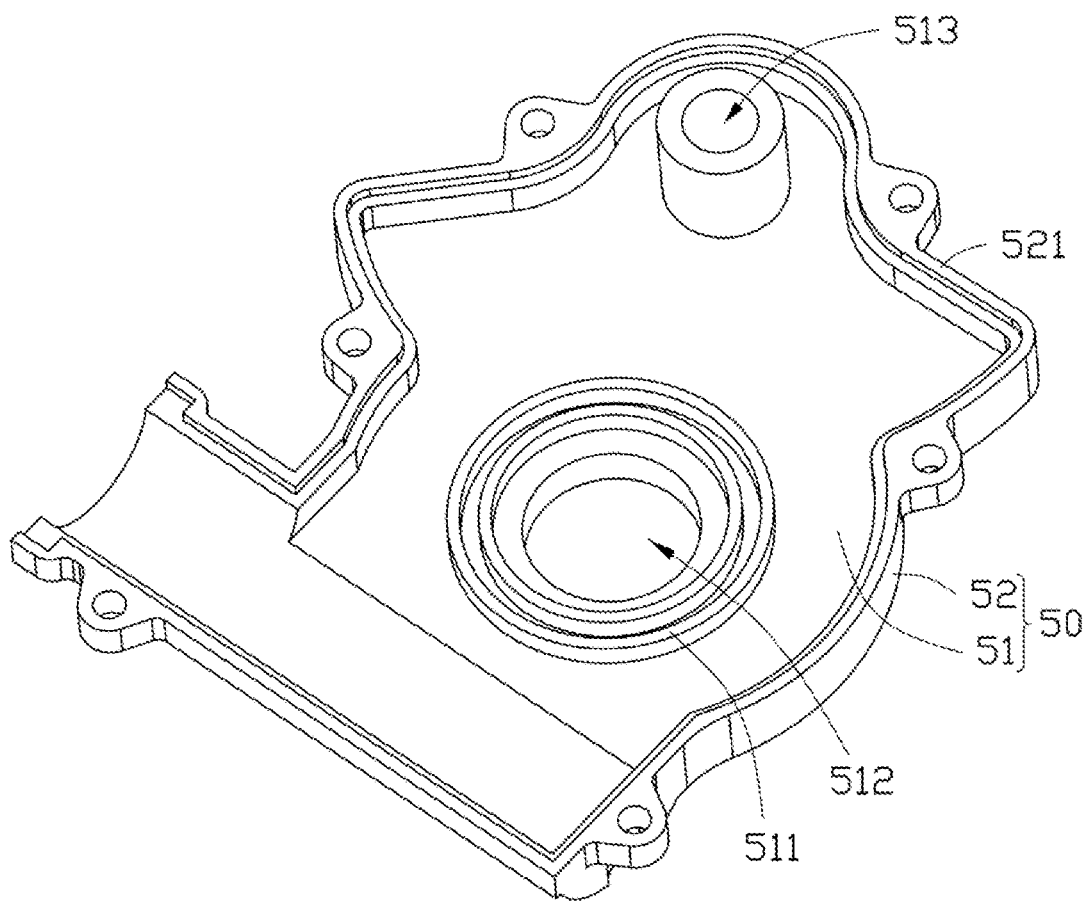
FIG. 4 is a perspective view of a gear lid of the parking lock actuator shown in FIG. 1.

Referring also to FIG. 4, the gear lid 50 includes a lid bottom wall 51 and a lid side wall 52 extending perpendicularly downwards from periphery of the lid bottom wall 51.

Referring also to FIG. 2, in assembly, the driving motor 20, the reduction transmission mechanism 30, the output mechanism 40, the gear lid 50, and the controller 60 are placed in the casing 10. The output mechanism 40, the reduction transmission mechanism 30, and the driving shaft 22 of the driving motor 20 are disposed in the mounting area enclosed by the partition wall 121 of the lower cover 12. The output gear 42 of the output mechanism 40 is engaged with the second gear 32 of the reduction transmission mechanism 30 and the connection hole 411 faces the lower cover 12. Correspondingly, the emergency unlocking feature 421 faces the upper cover 11. The drive shaft 22 of the driving motor 20 meshes with the first gear 31 of the reduction transmission mechanism 30. Therefore, the driving force generated by the driving motor 20 is transferred to the output mechanism 40 through the reduction transmission mechanism 30.

The gear lid 50 is disposed between the upper cover 11 and the lower cover 12 to divide an interior space of the casing 10 into different mounting spaces. Specifically, the gear lid 50 is disposed in contact with the partition wall 121 of the lower cover 12. A first mounting space is bounded by the gear lid 50, the partition wall 121 and the lower cover 12. A second mounting space is bounded by the gear lid 50, the upper cover 11 and the lover cover 12. The output mechanism 40, the reduction transmission mechanism 30, and the drive shaft 22 of the driving motor 20 are disposed in the first mounting space. In the embodiment, the gear lid 50 is a made of resin.

The end of the lid side wall 52 mates with the partition wall 121 of the lower cover 12. Specifically, a free end of the lid side wall 52 forms an uneven structure 521, and the uneven structure 521 is complementary to an uneven structure 122 formed on a free end of the partition wall 121, so that the gear lid 50 and the lower cover 12 can be tightly engaged with each other to form a dynamic seal to effectively prevent leakage of lubricating grease via a joint area between the gear lid 50 and the lower cover 12.

In addition, the lid bottom wall 51 has a first through hole 513 and a second through hole 512. An end of the connecting shaft 33 of the reduction transmission mechanism 30 extends through the second through hole 512 and is rotatably mounted to the casing 10 through a bearing connection or the like. The first through hole 513 is in alignment with the opening 111 of the upper cover 11. Specifically, in assembly, the emergency unlocking feature 421 is in coaxial alignment with the opening 111 and the first through hole 513. A diameter of the first through hole 513 is the same as or slightly smaller than that of the opening 111. Thus, the emergency unlocking feature 421 can be actuator with an unlocking tool, such as a hex wrench, through the opening 111. Specifically, in an emergency situation, for example, the electric actuator fails or the battery is dead, an user can handle a tool to sequentially pass through the opening 111 of the upper cover 11 and the first through hole 513 of the gear lid 50 to be engaged with the emergency unlocking feature 421. Then, the user operates the emergency unlocking feature 421 by means of the tool to effect manual reverse rotation of the output gear 42 to unlock the parking lock actuator 100. It is to be understood that the emergency unlocking feature 421 can also be a structure of other shapes, which is not limited by what is disclosed in the present embodiment. Preferably, the emergency unlocking feature 421 and the plug 112 can be operated by the same specification tool, thereby facilitating the user to perform the work.

In addition, in one embodiment, the lid bottom wall 51 is provided with an annular flange 514 protruding on a top side of the lid bottom wall 51 and surrounding the first through hole 513. In assembly, the annular flange 514 extends into the extension portion 113, and the end of the annular flange 514 abuts against the blocking portion 114, and the outer circumferential surface of the annular flange 514 abuts against the inner wall surface of the extension portion 113. A dynamic seal is formed by the nesting structure of the annular flange 514 and the extension portion 113 to prevent leakage of lubricating oil from the emergency unlocking feature 421 to a maximum extent.

The lid bottom wall 51 is provided with a plurality of concentric rings 511 on a side facing the lower cover 12, and around the second through hole 512. The concentric rings 511 are capable of matching with the annular grooves 311. That is, in assembly, the concentric rings 511 can be correspondingly embedded in the annular grooves 311. In work of the parking lock actuator 100, the concentric rings 511 can cooperate with the annular grooves 311 to form a dynamic seal to prevent lubricating oil from the second through hole 512 to a maximum extent.

The controller 60 is electrically coupled to the driving motor 20. The controller 60 is configured to receive an electrical signal and control the driving motor 20 according to the electrical signal. The controller 60 is mounted in the second installation space. That is, the controller 60 is separated from the transmission mechanism 30 and the output mechanism 40 by the gear lid 50, and can effectively prevent impurities, such as the abrasion particles generated during operation of the transmission mechanism 30 and the output mechanism 40 and lubrication necessary for the operation thereof, from contaminating the controller 60 to cause a short circuit failure of the controller 60. Therefore, a reliability of the parking lock actuator 100 is improved. In one embodiment, the controller 60 is a Printed Circuit Board Assembly (PCBA).

In summary, the parking lock actuator 100 according to present disclosure is compact in structure. The controller 60 and the reduction transmission mechanism 30 are isolated by providing the gear lid 50, thereby improving the reliability of the actuator 100. In addition, the parking lock actuator 100 further has an emergency unlocking feature 421 for convenient operation.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

What is claimed is:

1. An electronic parking lock actuator, comprising:
a driving motor;
an output mechanism comprising an emergency unlocking feature;
a reduction transmission mechanism connected between the driving motor and the output mechanism to transfer a driving force generated by the driving motor to output mechanism; and
a controller electrically coupled to and configured to control the driving motor; and
a casing receiving all of the driving motor, the output mechanism, the reduction transmission mechanism, the controller therein, the casing defining an opening configured to expose the emergency unlocking feature;
wherein the electronic parking lock actuator further comprises a plug detachably plugged into the opening of the casing.

2. The electronic parking lock actuator of claim 1, further comprising a gear lid installed in the casing, wherein the output mechanism and the reduction transmission mechanism are disposed on one of opposite sides of the gear lid, the controller is disposed on the other one of the opposite sides of the gear lid to isolate the controller from the output mechanism and the reduction transmission mechanism by the gear lid, the gear lid defines a first through hole in alignment of the opening of the casing and the emergency unlocking feature.

3. The electronic parking lock actuator of claim 2, wherein the gear lid is provided with an annular flange surrounding the first through hole, the casing is provided with a cylindrical extension portion surrounding the opening a blocking portion depending on the inner wall of the extension portion, the annular flange extends into the extension portion, the end of the annular flange abuts against the blocking portion, the outer circumferential surface of the flange abuts against the inner wall surface of the extending portion.

4. The electronic parking lock actuator of claim 2, the casing comprises an upper cover and a lower cover mated with each other, and the lower cover is provided with a partition wall depending on a side of the lower cover facing the upper cover, a mounting area is enclosed by the partition wall, the gear lid comprises a lid bottom wall and a lid side wall extending perpendicularly downwards from periphery of the lid bottom wall, the lid side wall mates with the partition wall of the lower cover to close the reduction transmission mechanism and the output mechanism between the cover and the lower cover.

5. The electronic parking lock actuator of claim 4, wherein the end of the lid side wall has an uneven structure, and the uneven structure is complementary to an uneven structure of the partitioning wall, so that the gear lid and the lower cover is tightly engaged with each other.

6. The electronic parking lock actuator of claim 2, wherein the gear lid defines a second through hole, the reduction transmission mechanism is a double gear set comprising a first gear, a second gear with a diameter smaller than that of the first gear, and a connecting shaft; the first gear and the second gear are coaxially fixedly coupled by the connecting shaft, an end of the connecting shaft is rotatably positioned in the second through hole of the gear lid.

7. The electronic parking lock actuator of claim 6, wherein the first gear defines a plurality of concentric annular grooves around the center of the first gear, the lid bottom wall is provided with a plurality of concentric rings on a side facing the lower cover around the second through hole, the concentric rings are correspondingly embedded in the annular grooves.

8. The electronic parking lock actuator of claim 6, wherein the driving motor comprises a motor body and a driving shaft extending from the motor body, the driving motor is a DC motor, a worm is formed on the driving shaft.

9. The electronic parking lock actuator of claim 8, wherein the motor body and a driving shaft are wholly received in the casing.

10. The electronic parking lock actuator of claim 6, wherein the output mechanism comprises an output gear engaged with the second gear of the reduction transmission mechanism and an output shaft coaxially extends from the output gear.

11. The electronic parking lock actuator of claim 1, wherein the emergency unlocking feature is a hexagonal hole.

\* \* \* \* \*